(12) United States Patent
Rönneke

(10) Patent No.: US 9,596,596 B2
(45) Date of Patent: Mar. 14, 2017

(54) MACHINE-TO-MACHINE DEVICE TRIGGERING USING SESSION INITIATION PROTOCOL UNIFORM RESOURSE IDENTIFIER

(75) Inventor: Hans Bertil Rönneke, Kungsbacka (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 868 days.

(21) Appl. No.: 13/576,087

(22) PCT Filed: Feb. 15, 2010

(86) PCT No.: PCT/EP2010/051867
§ 371 (c)(1),
(2), (4) Date: Jul. 30, 2012

(87) PCT Pub. No.: WO2011/098150
PCT Pub. Date: Aug. 18, 2011

(65) Prior Publication Data
US 2012/0302229 A1    Nov. 29, 2012

(51) Int. Cl.
*H04L 29/12* (2006.01)
*H04W 8/26* (2009.01)
(Continued)

(52) U.S. Cl.
CPC ......... *H04W 8/26* (2013.01); *H04L 29/12754* (2013.01); *H04L 29/12896* (2013.01);
(Continued)

(58) Field of Classification Search
CPC .......... H04L 61/2514; H04L 29/12367; H04L 61/2503
(Continued)

(56) References Cited

U.S. PATENT DOCUMENTS 7,502,339 B1 *   3/2009  Pirkola ................... H04L 12/66
                                                              370/310
2003/0110292 A1 *  6/2003  Takeda et al. ................ 709/245
(Continued)

FOREIGN PATENT DOCUMENTS

WO       2006088947 A2     8/2006
WO       2009068111 A1     6/2009

OTHER PUBLICATIONS

Vodafone, "Addition of Cell ID to SIP messages—Updated Register requests in 24.228" 3GPP Draft; N1-011747, 3rd Generation Partnership Project (3GPP), Mobile Competence Centre; 650, Route Des Lucioles; F-06921 Sophia-Antipolis Cedex; France, vol. CN WG1, No. Washington, USA; Nov. 9, 2001, XP050065517 consisting of 20-pages.

(Continued)

*Primary Examiner* — Omoniyi Obayanju
(74) *Attorney, Agent, or Firm* — Christopher & Weisberg, P.A.

(57) ABSTRACT

A machine-to-machine communication proxy node is presented herein. The proxy node may be used as a translation device in machine-to-machine communications. For example, if an application server in a packet based network initiates communication with device in a mobile network, the proxy node may be utilized to translate application domain specific device identities coded in the format of Session Initiation Protocol (SIP) and Uniform Resource Identifier's (URI's) to mobile specific identities such as IMSI and establish communication connection in the mobile network. This identifying of mobile devices may be utilized to replace the commonly used E.164 Mobile Subscriber Integrated Services Digital Network (MSISDN) numbers for identifying mobile devices.

9 Claims, 4 Drawing Sheets

(51) Int. Cl.
 *H04W 4/00* (2009.01)
 *H04L 29/06* (2006.01)
 *H04W 76/02* (2009.01)
 *H04W 88/18* (2009.01)
(52) U.S. Cl.
 CPC ........ *H04L 61/106* (2013.01); *H04L 61/3085* (2013.01); *H04L 61/605* (2013.01); *H04L 65/104* (2013.01); *H04L 65/105* (2013.01); *H04L 65/1006* (2013.01); *H04W 4/005* (2013.01); *H04W 76/02* (2013.01); *H04W 88/182* (2013.01)
(58) Field of Classification Search
 USPC ...................................................... 455/432.2
 See application file for complete search history.

(56) References Cited

U.S. PATENT DOCUMENTS

| | | | |
|---|---|---|---|
| 2008/0045203 A1* | 2/2008 | Nordin et al. | 455/422.1 |
| 2009/0161666 A1 | 6/2009 | Ku | |
| 2009/0172138 A1* | 7/2009 | Wang | H04L 29/12066 709/223 |

OTHER PUBLICATIONS

3rd Generation Partnership Project; Technical Specification Group Services and System Aspects; System Improvements for Machine-Type Communications; (Release 10), 3GPP Standard; 3GPP TR 23.888, 3rd Generation Partnership Project (3GPP), Mobile Competence Centre; 650, Route Des Lucioles; F-06921 Sophia-Antipolis Cedex; France, No. V0.2.1, Feb. 1, 2010, pp. 1-19, XP050401847 consisting of 20-pages.

International Search Report and Written Opinion dated Nov. 11, 2010 for PCT/EP2010/051867; International Filing Date: Feb. 15, 2010 consisting of 12-pages.

\* cited by examiner

MACHINE-TO-MACHINE DEVICE TRIGGERING USING SESSION INITIATION PROTOCOL UNIFORM RESOURSE IDENTIFIER

CROSS-REFERENCE TO RELATED APPLICATIONS

This application is a Submission Under 35 U.S.C. §371 for U.S. National Stage Patent Application of International Application Number: PCT/EP2010/051867, filed Feb. 15, 2010 entitled "MACHINE-TO-MACHINE DEVICE TRIGGERING USING SESSION INITIATION PROTOCOL UNIFORM RESOURCE IDENTIFIER," the entirety of which is incorporated herein by reference.

TECHNICAL FIELD

Machine-to-machine communication in cellular networks.

BACKGROUND

With Machine-to-Machine (M2M) communication being more and more deployed in cellular networks, problems with how to address the M2M devices (user equipment; UE's) for Mobile Terminated Communication from M2M application servers arise. With the use of dynamic IP address assignments, a mechanism where the M2M application server gets to know the IP address of the device needs to be present. In some applications the device/UE itself can contact the M2M application server and inform about its presence and IP address, but in other applications the communication needs to be initiated from the M2M application server side, where the application server may not know the IP address of the device.

Another problem with the growing interest in M2M cellular communications is that each device/UE today is assigned an E.164 Mobile Subscriber Integrated Services Digital Network (MSISDN) number. With the expected growth of M2M devices being 50 Billion and beyond, these identities will soon be exhausted. This has been pointed out by the International Telecommunications Union (ITU) which has asked 3GPP to find new solutions for addressing mobile devices. It is even suggested that the E.164 MSISDN shall not be mandatory for M2M devices anymore, as these numbers are mainly targeted for human communication.

SUMMARY

Currently Mobile Terminated Communication with M2M devices is often based on Short Message Service (SMS) where the E.164 MSISDN is required for addressing. The E.164 MSISDN is a number assigned to an M2M device to uniquely identify the device in a mobile network. This solution does not scale for a large number of M2M devices. The Short Message Service Centers (SMSCs) also have problems in meeting the delay and response time requirements that many M2M applications have (e.g. for emergency type of applications).

It is also a problem that Public Land Mobile Network (PLMN) specific identifiers need to be used in the development of the M2M applications in servers outside the PLMN. This solution creates unnecessary dependencies between the two domains. Furthermore, this also results in development being slowed due to the constraints for how to allocate the various identities.

For some M2M applications, which include infrequent communication with small amounts of data (e.g., a monthly reading of an electricity meter), the relatively large amount of overhead of signaling (e.g., attach, bearer & periodic) in mobile system can be a problem when large sets of M2M devices are present in the network.

Thus, solutions directed towards the resolution of the above mentioned deficiencies are presented herein. Example embodiments provide the replacement of E.164 MSISDN with Session Initiation Protocol (SIP) and Uniform Resource Identifier's (URI's) for identifying M2M devices, thereby freeing more resources to be used for human involved communications. Example embodiments also provide a decoupling of PLMN identities from M2M applications outside of the PLMN. Thus, externally from the PLMN, SIP and SIP URI's may be used in place of the PLMN identities. This enables the M2M application service provider to be free to use his formation in the identification of associated M2M devices. The chosen identities are transparent to the mobile operator and are seen and treated in the same manner as any other URI's.

Example embodiments may also involve a combined SIP server and mapping function at the border between the Packet Data Network (PDN), where a M2M application server may be located, and the PLMN, where the M2M device may be located. The SIP server may act as a SIP Proxy on behalf of the device and taking a full user agent role. At this border, the SIP URI may be translated to PLMN internal information and vice versa. Examples of PLMN internal information may include, but are not limited to, an International Mobile Subscriber Identity (IMSI), IP-address(es) of the device, temporary identifiers used for paging (e.g., a Packet—Temporary Mobile Subscriber Identity (P-TMSI), and a System architecture evolution—Temporary Mobile Subscriber Identity (S-TMSI)) if the device is idle or no bearers have been activated, and cell(s) where the device has been last reported its location. If the device has several PDP contexts/PDN connections or if the device uses both IP version 4 and IP version 6 simultaneously there may multiple IP addresses. In that case the PLMN internal information may include characteristics of the IP address information e.g. IP version, quality of service or priority of the corresponding bearer etc.

Example embodiments may involve an optimized registration procedure for M2M devices in the 3GPP network. The optimized registration procedure may include utilizing a field in the Protocol Configuration Options (PCO) where attach/bearer activation messages may be used to convey a device identity to the SIP server/mapping function (i.e. to register the device).

Furthermore, example embodiments may also include a possibility to initiate paging from the SIP server/mapping function if the M2M device is idle, or has no bearers activated (and hence no IP address is available), or the device is in some other detach state only listening to the paging channel at frequent or infrequent intervals.

Example embodiments also include a SIP server/mapping function where small amounts of data, which are included in the SIP signaling (e.g., an SIP Invite), is translated to SMS messages and sent to the M2M device, e.g., using IMSI (no E.164 MSISDN would be required). For optimized real-time performance the SMS may be delivered directly to the Mobile Management Entity/Serving General packet radio service Support Node (MME/SGSN) or even a Radio Access Network (RAN) node (e.g., eNodeB/RNC/BSC) without passing the SMSC. Bypassing the SMSC avoids store-and-forward delays as well as reduces the amount of required communications signaling. This mechanism may be bi-directional, i.e., answers from the M2M device may be mapped and sent back using SIP signaling (e.g., SIP 200 OK) to the originating application server.

DEFINITIONS

APN—Access point name
DSCP—DiffServ Code Point
GGSN—Gateway General packet radio service Support Node
HSS—Home Subscriber Server
IE—Information Element
IMSI—International Mobile Subscriber Identity
M2M—Machine-to-Machine
MME—Mobile Management Entity
MSISDN—Mobile Subscriber Integrated Services Digital Network
MTC—Mobile Type Communication
P-TMSI-Packet—Temporary Mobile Subscriber Identity
PCO—Protocol Configuration Options
PDN—Packet Data Network
PGW—Packet data Network Gateway
PLMN—Public Land Mobile Network
QCI—QoS Class Identifier
RAN—Radio Access Network
S-TMSI—System architecture evolution—Temporary Mobile Subscriber Identity
SGSN—Serving General packet radio service Support Node
SIP—Session Initiation Protocol
SMS—Short Message Service
SMSC—Short Message Service Center
URI—Uniform Resource Identifier
UE—User Equipment

BRIEF DESCRIPTION OF THE DRAWINGS

The foregoing will be apparent from the following more particular description of example embodiments of the invention, as illustrated in the accompanying drawings in which like reference characters refer to the same parts throughout the different views.

The drawings are not necessarily to scale, emphasis instead being placed upon illustrating embodiments of the present invention.

DETAILED DESCRIPTION

In the description below the term M2M Device and MTC Device are used interchangeably. It should further be appreciated that an M2M device may function as an M2M application server in attempting to communicate with another M2M device. Therefore, the example embodiments describing functions of the M2M application server may also be applied to an M2M device.

Figure 1:
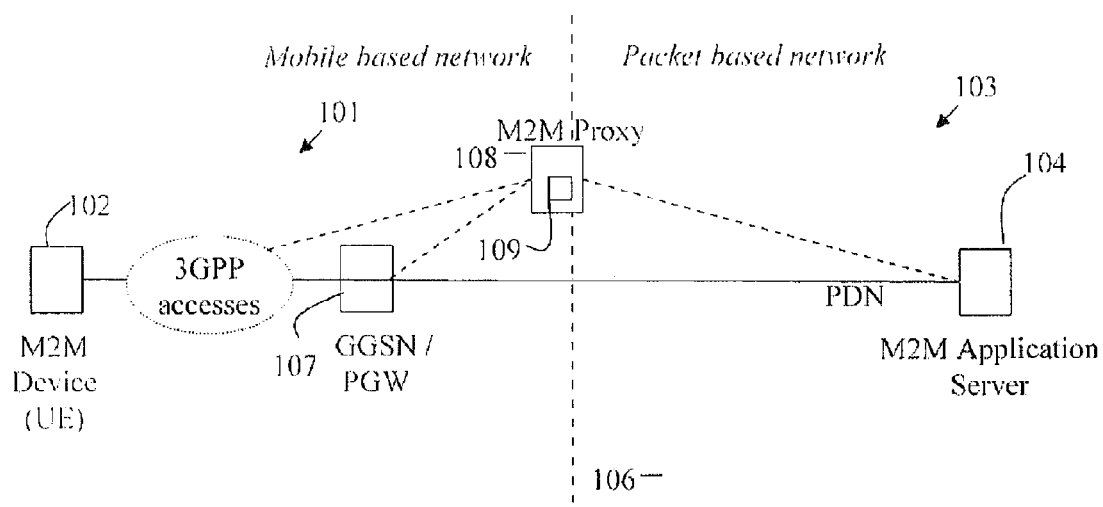
FIG. 1 is a schematic of a Machine-to-Machine communication network according to example embodiments.

In many applications, M2M servers in packet based networks may need to retrieve or send data from/to M2M devices. For example, the amount of usage of a utility monitored by a meter may need to be reported to a service provider. FIG. 1 illustrates a communications network which may be employed in machine-to-machine (M2M) communications according to example embodiments. The network 100 may include two distinct sub-networks. For example, a mobile based network 101, in which a M2M device 102 may be located, and a packet based network 103, in which a M2M application server 104 may be located. An M2M application server 104 located in a specific Packet Data Network (PDN) 106 may initiate communication and request data from a M2M device 102. An M2M proxy 108 may function as a session initiator where, for example, the device identity is in the format of a SIP URI, may be translated to, for example, an IP address of the M2M device 102 and returned M2M application server 104. The M2M proxy 108 may act as a translator of control plane information between the sub-networks 101 and 103. The M2M proxy 108 may also accept subscriptions of state changes for M2M Devices. In this case the M2M proxy will notify or publish to the requesting entity (e.g. M2M application server) the changed information (e.g. IP address, device status etc) of a device each time the information is changed.

Figure 2:
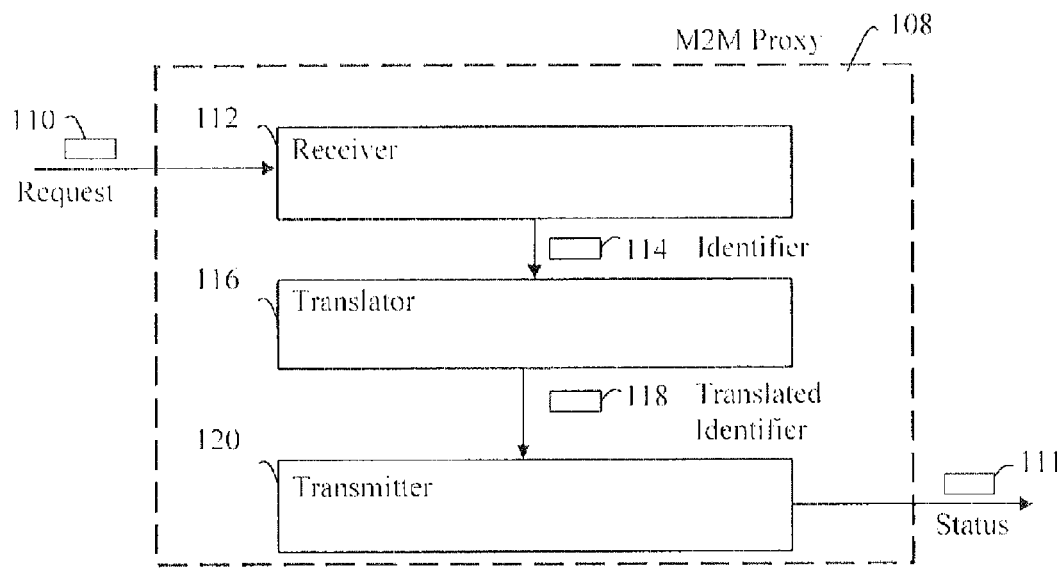
FIG. 2 is a block diagram of a machine-to-machine proxy node included in the communication network of FIG. 1.
Figure 3:
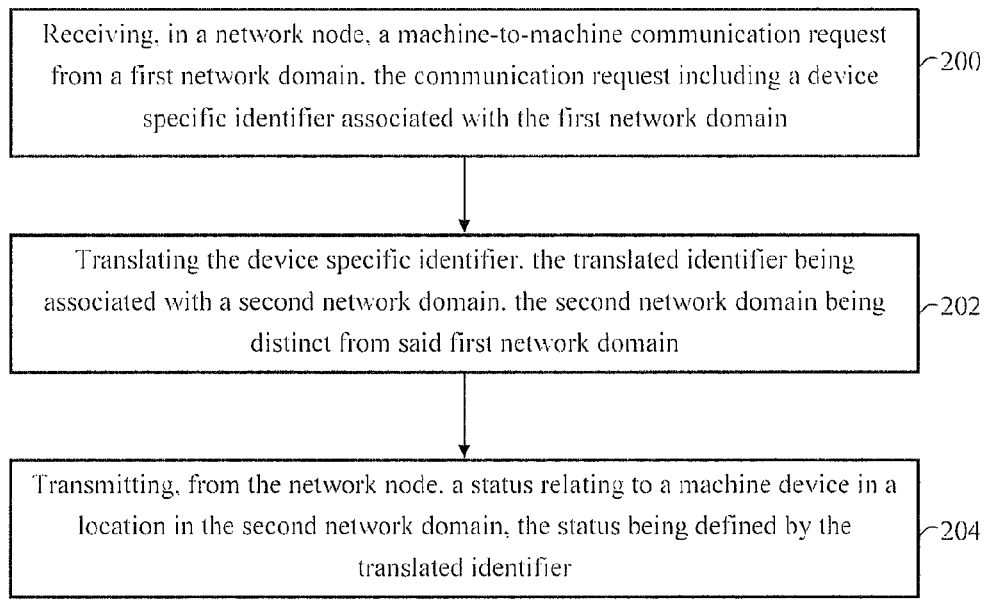
FIG. 3 is a flow chart of example operational steps which may be taken by the proxy node of FIG. 2.

As an overview, FIG. 2 provides a schematic of an example M2M proxy 108 and FIG. 3 is a flow diagram illustrating example operational steps which may be taken by the proxy 108. The M2M proxy 108 may include a receiver 112, which may be configured to receive a communication request 110 (200). The communication request 110 may include a device specific identifier associated with the first network domain (e.g., an IMSI in a mobile based network). The receiver 112 may abstract the device specific identifier from the request and send the identifier 114 to a translator 116. The translator may be employed to translate the identifier 114 into a translated identifier, where the translated identifier is associated with a second network domain (e.g.; a packet based network) (202). The translator 116 may thereafter send the translated identifier 118 to a transmitter 120. The transmitter 120 may send a status relating to a machine in the first network domain, the status being defined by the translated identifier (204).

In example embodiments, the M2M proxy 108, FIG. 2, may serve as a Session Initiation Protocol (SIP) server towards the external PDN 106 and the M2M application server 104. The receiver 112 may abstract the device specific identifier from the session initiation request 111 and send the identifier 114 to the translator 116. The translator may be employed to translate the identifier 114 into a translated identifier. The translator 116 may thereafter send the translated identifier 118 to the transmitter 120. The transmitter 120 may thereafter return the requested information to the requesting entity e.g. a M2M Application Server 104 as the status 111.

In example embodiments, the M2M proxy may serve as a Session Initiation Protocol (SIP) server towards the external PDN 106 and the M2M application server 104 by returning session related information of one or several sessions being initiated. The M2M proxy 108 may act as a SIP server towards one or several requesting clients. That is, the M2M proxy 108 controlling the M2M devices 102 may, in example embodiments, serve multiple M2M Application Servers 104 independently and simultaneously. The M2M proxy 108 may also act as a 3GPP functional entity in the mobile sub-network 101. The mobile sub-network, or the Public Land Mobile Network (PLMN), may include a number of communication devices and interfaces. For example, the PLMN may include Radio Access Networks (RANs), Servicing General packet radio service Support Nodes (SGSN), Mobility Management Entities (MME), Gateway General packet radio service Support Nodes (GGSN), Packet data Network Gateways (PGW), and/or Home Subscriber Server (HSS), etc.

In acting as a functional entity, the M2M proxy 108 may manage messages and identifying information which is provided from the PLMN. Specifically, in one example embodiment, the M2M proxy 108 may maintain a mapping table 109 and 120 storing information such as externally used device identifiers, the PLMN internal International Mobile Subscriber Identity (IMSI), SGSN/Mobility Management Entity (MME) address, one or more IP address of the device and QoS and priority related information of the IP addresses (e.g. QCI, DSCP etc). The mapping table 109 may be organized such that every entry of a PLMN based identifier may be associated with its associated PDN based identifier and vice versa. FIGS. 4 through 8 more specific provide examples of how the M2M proxy 108 may be utilized in machine communications. It should be appreciated that in all example embodiments, the M2M Proxy may be a function in the GGSN/PGW or inside some other node at the PLMN border or being a standalone functional entity.

Device Registration/Deregistration

In creating and maintaining a mapping table, a M2M device 102 may initiate a device registration with the M2M proxy 108. As a result of device registration, the M2M proxy 108 may easily translate necessary device identifications, store device information and status such as IP address(es) or locations, for the mobile sub-network 101 and provide these on request from the packet based network 103.

Figure 4:
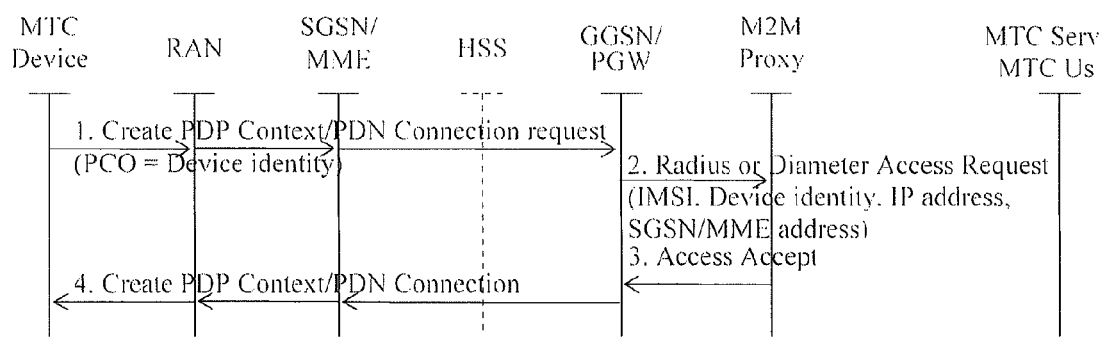
FIG. 4 is a message sequence diagram of device registration.

FIG. 4 provides a detailed message sequence diagram of device registration, according to example embodiments. First, the M2M device (or Machine Type Communication [MTC] device) 102 may create a bearer by sending a Create PDP context request or a Create PDN Connection request. The MTC device may include in the bearer request an application specific device identity in the Protocol Configuration Option (PCO) field. The device identity may be forwarded to the GGSN/PGW transparently, or unchanged (FIG. 4, step 1).

The GGSN/PGW 107 may in-turn allocate an IP address for the MTC device. If the device identity field is present in the PCO Information Element (IE), the GGSN/PGW 107 may forward the device identity together with the IMSI, IP address, and/or SGSN/MME address to the M2M proxy 108 (FIG. 4, step 2). The information may be forwarded as a request using, for example, a Radius or Diameter protocol, or any other Authentication, Authorization, and Accounting (AAA) protocol known in the art. The address of the M2M proxy 108 may be preconfigured in the GGSN/PGW 107 (e.g. per Access point name (APN)) or retrieved by any other means known in the art.

Thereafter, the M2M proxy 108 may send an accept message to the GGSN/PGW 107 after a mapping entry has been established or updated in the M2M proxy 108 (FIG. 4, step 3). In an alternative embodiment, a Radius/Diameter server in the M2M proxy 108 may also allocate the IP address for the device. In this case, the assigned IP address is also returned to the GGSN/PGW 107 in the accept message. Upon receipt of the Access Request, the GGSN/PGVV. SGSN/MME, and RAN may create a bearer using a Create PDP context response or a Create PDN Connection response (FIG. 4, step 4).

Figure 5:
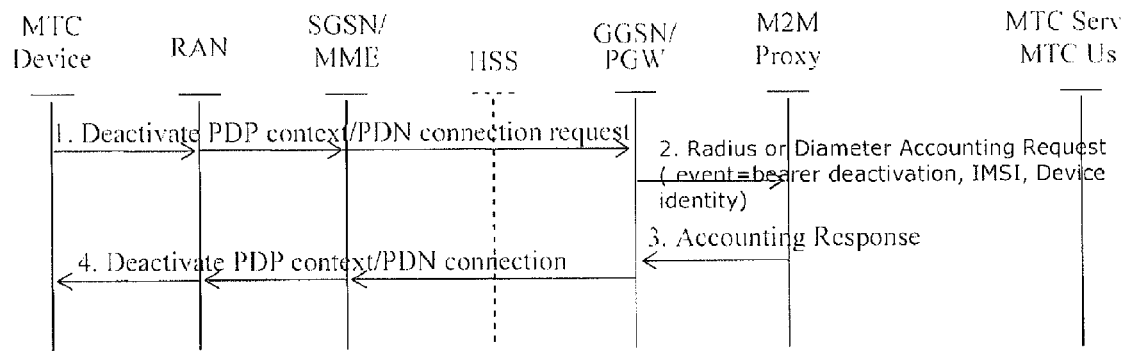
FIG. 5 is a message sequence diagram of device deregistration.
Figure 7:
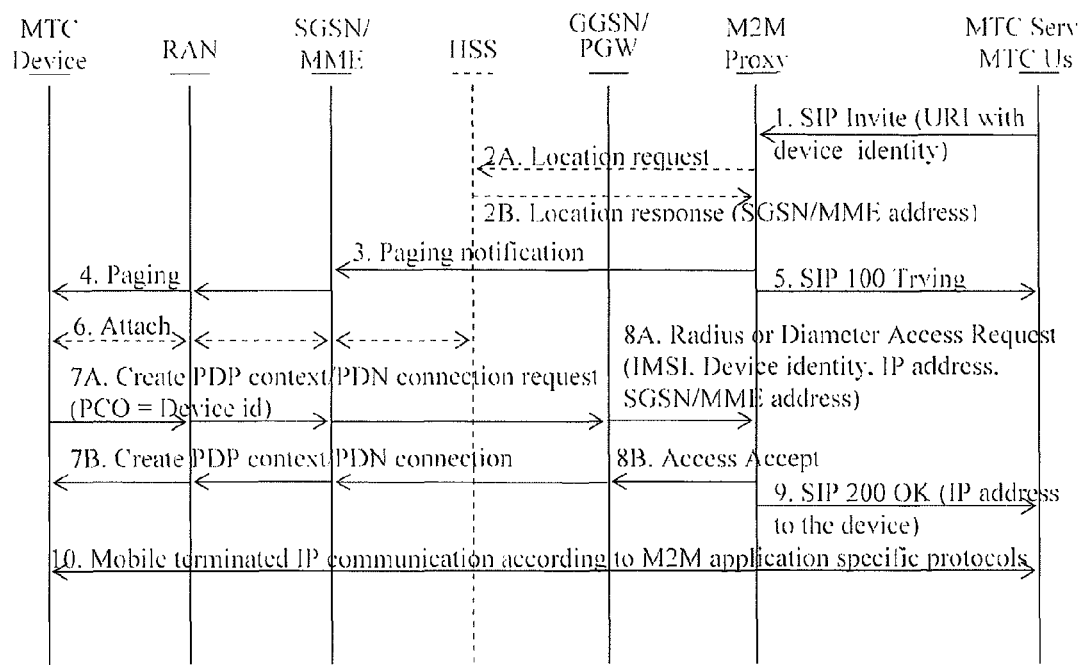
FIG. 7 is a message sequence diagram of a machine application initiated communication with an unregistered device.

Upon the completion of communication between the M2M application server 104 and the M2M Device 102, the bearers in the Mobile based network 101, may or may not be deactivated. The M2M Device 102 may initiate the bearer deactivation on its own initiative or on command from the M2M Application server 104 using any standard or proprietary protocol between the two. An example of device bearer deactivation is provided in FIG. 5. When the bearer(s) are deactivated for a device, a Deactivate PDP Context request or Deactivate PDN Connection request may be forwarded up to the GGSN/PGW 107 (FIG. 5, step 1). The GGSN/PGW 107 may thereafter notify the M2M proxy 108 by using, for example, Radius or Diameter protocol (FIG. 5, step 2). The M2M proxy 108 may thereafter remove the bearer related information from the mapping table 109 for the particular device, e.g. the IP address. The removal of bearer related information results in the device needing to be paged and a bearer created if an M2M application server (MTC Server/MTC User) wants to established a session with the device in the future (FIG. 7). If the M2M Device 102 is unreachable (e.g. not attached or not listening to any paging channel) and the paging will fail or if the M2M proxy 108 has status information about the device saying that it is unreachable, any SIP invite will be given an negative response (e.g., 'Client Gone'). After updating the mapping table 109, the M2M proxy 108 may send an acknowledgement or accounting response to the GGSN/PGW 107 (FIG. 5, step 3). The GGSN/PGW 107 may in-turn forward a Deactivate PDP Context response of Deactivate PDN Connection response message onto the MTC device 102 and the hearer deactivation will proceed as normal (FIG. 5, step 4).

Device Triggering (with and without Extablished Bearers)

For many M2M applications there may be an interest to poll communications between MTC devices and the M2M application server. This may be because an MTC user may want to be in control of communication from MTC devices, and therefore does not allow MTC devices to randomly access the application server. Polling may also be useful for MTC devices that are not continuously attached to a network (e.g., devices that do not have continuous PDP/PDN connection). Thus, it may be beneficial to trigger MTC devices to attach and/or establish a PDP/PDN connection based on a trigger indication from the M2M application server.

A way to be able to address and trigger MTC devices both when they are attached with bearers and attached without bearers may be to identify MTC devices using SIP URI's. The identity of a device, for example "123456," could then be part of a SIP URI coded into the user part (e.g., as sip:123456@mtc-provider-name.operator-name.com). A device which knows its own identity registers in the network, and the device identity together with the IP address of the UE, is stored in a M2M Proxy. An MTC User or MTC Server may then easily retrieve the IP address of the MTC Device using basic session signalling. In the example configuration the MTC Proxy takes a full UA role and may immediately respond to a Session Request with a Session Response returning the IP address of the particular MTC Device. Thereafter, the normal application specific UDP/TCP/IP communication can start.

Figure 6:
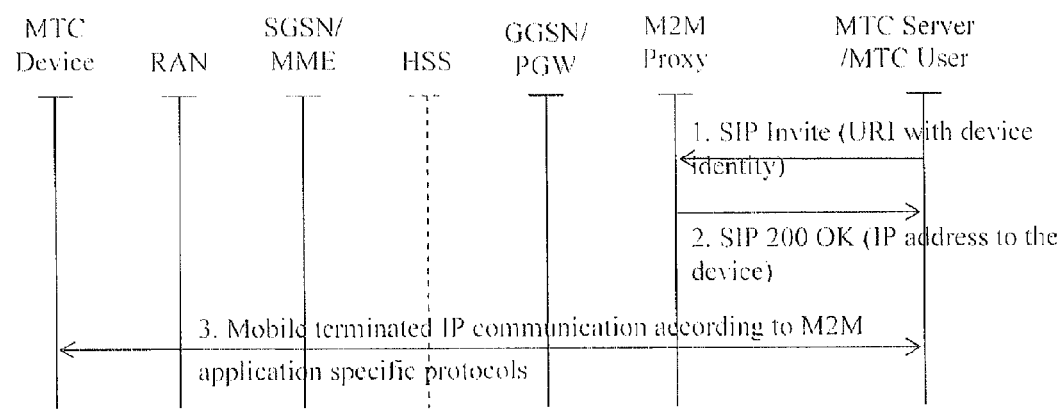
FIG. 6 is a message sequence diagram of a machine application initiated communication with a registered device.

FIG. 6 provides a detailed message sequence diagram depicting the triggering of a device 102 having bearers. When the M2M application server 104 wants to communicate with the MTC device 102, a session request e.g. using a SIP invite including a SIP URI with the packet based device identity may be sent to the M2M proxy 108 (FIG. 6, step 1). The address to the M2M proxy 108 may be obtained, for example, by the Domain Name System (DNS) resolving the Fully Qualified Domain Name (FQDN) host part of the SIP URI or by other means known in the art.

Thereafter, the M2M proxy 108 may use the received packet based device identity to search in the mapping table 109 for a corresponding PLMN based identifier and location (e.g. SGSN or MME address; or translated identifier 118). In doing so, the M2M proxy 108 also ensures that the MTC device 102 has an IP address (e.g., a bearer has been established). If an IP address exists, the M2M proxy 108 may immediately return a session response (e.g. an SIP 200 OK message; or status 111) with the IP address of the MTC device 102 to the requesting M2M application server 104 (FIG. 6, step 2). Once the M2M application server 104 has obtained the IP address of the MTC device 102, IP communication according to any application specific protocols may commence (FIG. 6, step 3).

The session request and response can in an alternative embodiment be implemented using a subscribe/notify mechanism. In such a case the first session request will indicating a subscription to the M2M Proxy 108. The M2M Proxy will then send a session notification every time the information about a M2M device 102 has been changed. That is, the M2M application server 104 will then continuously be updated of any status change of any information in the mapping table 109.

FIG. 7 provides a detailed message sequence diagram depicting the triggering of a device without a bearer, but with an entry in the mapping table 109. If there is no entry at all in the mapping table 109 (i.e. the device has never registered), a SIP invite will be given an immediate negative response (e.g. 'Not found').

According to example embodiments, the triggering of a device without a bearer may be achieved with the use of paging to locate the device in the PLMN. First, when the M2M application server 104 wants to communicate with the MTC device 102, a session request (e.g. a SIP invite; request 110) including the URI with the device identity (identity 114) is sent to the M2M proxy 108 (FIG. 7, step 1). Similarly to the example of FIG. 6, the address of the M2M proxy 108 may be obtained by the DNS resolving the FQDN host part of the URI or by other means known in the art.

In the case that the MTC device 102 is non-stationary (e.g., the M2M device is allowed to move according to subscription information), the M2M proxy 108 may request location information from the HSS (FIG. 7, step 2A). The HSS may respond with the address to the SGSN/MME where the MTC device 102 may be reached (FIG. 7, step 2B). For stationary devices, the SGSN/MME address may be stored in the M2M proxy 108 to save HSS signaling.

Thereafter, a paging notification may be sent by the M2M proxy 108 to the SGSN/MME where the MTC device 102 is known (FIG. 7, step 3). The SGSN/MME may in return send a paging message to the MTC device 102 (FIG. 7, step 4). The paging message sent by the SGSN/MME may be a normal paging or an optimized paging for M2M devices. In the meantime, the M2M proxy 108 may send a SIP 100 Trying message (e.g., status 111) to the M2M application server 104 indicating that communication establishment will be attempted and that this may take some time (FIG. 7, step 5).

If the MTC device 102 wasn't attached but can still receive the paging notification, the MTC device 102 will thereafter attach to the network (FIG. 7, step 6). The MTC device 102 may then send a bearer request (i.e. Create PDP Context request or Create PDN Connection request) to the network and thereafter the bearer may be created (FIG. 7, steps 7A and 7B). The bearer request may include an application specific device identity in the PCO field.

Upon receiving the request from the MTC device 102, the GGSN/PGW 107 may allocate an IP address for the MTC device 102. The GGSN/PGW 107 may also notify the M2M proxy 108 that the MTC device now has a bearer. The GGSN/PGW 107 may provide the M2M proxy 108 with the device identity together with the IMSI, IP address, and SGSN/MME address (FIG. 7, step 8A) and other bearer related information (e.g. QoS, priority etc). An Access Request using the Radius or Diameter protocol may be used, or any other protocol known in the art (FIG. 7, step 8B). The address of the M2M proxy 108 may be preconfigured in the GGSN/PGW 107 (e.g., per APN) or retrieved by some other means.

Upon receiving the information from the GGSN/PGW 107, the M2M proxy 108 may create or update the mapping table 109 with the associated PLMN and PDN identifications for the device to be used in future communications, and with any bearer related information e.g. IP address(es), QoS etc. The M2M proxy 108 may then return a SIP 200 OK message with the IP address(es) of the MTC device 102 to the requesting M2M application server 104 (FIG. 7, step 9). The 200 OK message may optionally be sent with a certain delay after the Access Accept message has been sent in order to allow for the bearer to be fully established (FIG. 7, step 8B). Thereafter, IP communication may commence according to any application specific protocols (FIG. 7, step 10). The session request and response can in an alternative embodiment be implemented using a subscribe/notify mechanism as described for FIG. 6 above.

In another example embodiment, triggers may be broadcast using, for example, the Cell Broadcast Service (CBS), or any other broadcast mechanism known in the art. A Cell Broadcast Center (CBC) may be utilized under the control of a mobile network operator. Connected to a CBC may be one or more Cell Broadcast Entities (CBE) which may originate CBS messages. A mobile network operator may make an interface available to the CBC to trusted third parties to interconnect their CBE to the CBC of the mobile network operator. The MTC devices may be programmed to monitor a present CB channel(s), even when they are not attached to the network, and have assigned an Unique Paging Identity (UPID). This way the M2M application server of the third party is able to send CBS messages, including one or more UPIDs to its MTC device in certain areas based on location information available to the M2M application server.

Small Data Communication with Minimized Signaling

Figure 8:
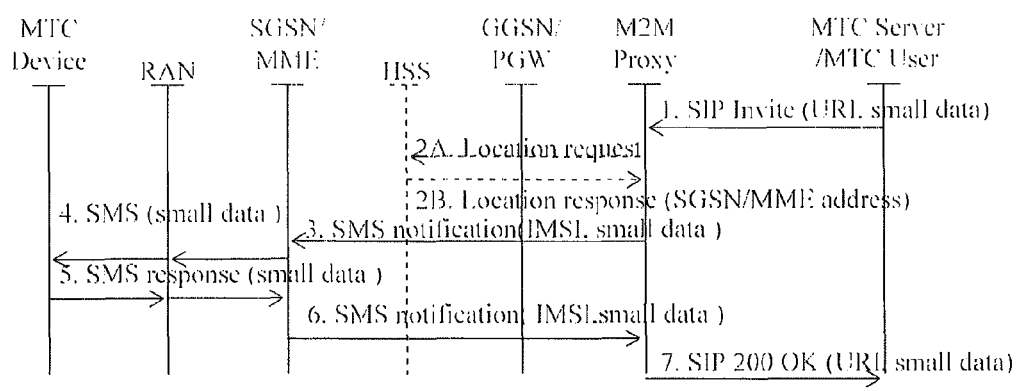
FIG. 8 is a message sequence diagram of a small data transfer communication.

In many instances, the M2M application server 104 may need to send a small amount of data to the MTC device 102 and vice versa. FIG. 8 provides an example of small data communication with minimized signaling to an unregistered MTC device. First, the M2M application server 104 may initiate communication by sending a SIP Invite message (e.g., communication request 110) to the M2M proxy 108 (FIG. 8, step 1). The SIP Invite message may include an URI with the device identity (identity 114) and the small data to be transmitted. The address of the M2M proxy 108 may be obtained by the DNS resolving the FQDN part of the URI.

For the case of non-stationary MTC devices, the M2M proxy 108 may request location information from the HSS (FIG. 8, step 2A). The HSS may respond with, for example, the address to the SGSN/MME where the device may be reached (FIG. 8, step 2B). For stationary devices, the SGSN/MME address may be stored in the M2M proxy 108 to save HSS signaling.

The M2M proxy 108 may thereafter send an SMS notification to the SGSN/MME responsible for the device (FIG. 8, step 3). The SMS notification may include the IMSI associated with the device and the small data. The SGSN/MME may in-turn send the SMS message including the small data to the MTC device 102 (FIG. 8, step 4). The MTC device 102 may respond by sending an SMS back to the SGSN/MME (FIG. 8, step 5). The SMS message of step 5 may be empty, and will then be treated as just an acknowledgement of the received SMS message of step 4. Alternatively, the SMS message of step 5 may include small data the MTC device may wish to send back The SGSN/MME may return the SMS message from the MTC device 102 to the M2M proxy 108 (FIG. 8, step 6). The M2M proxy 108 may then update the mapping table 109 and register the MTC device 102. The M2M proxy 108 then sends an SIP 200 OK message (e.g., status 111) back to the M2M application server 104 (FIG. 8, step 7). If the MTC device 102 responded with some data, the small data is included in the 200 OK message. If the MTC device 102 has a bearer activated, the M2M proxy 108 may optionally in step 3 send the small data in a User Datagram Protocol (UDP)/IP packet to the MTC device. The device may in that case also respond with a UDP/IP packet to the M2M proxy 108. A subsequent SIP 200 OK will then follow.

While this invention has been particularly shown and described with references to example embodiments thereof, it will be understood by those skilled in the art that various changes in form and details may be made therein without departing from the scope of the invention encompassed by the appended claims.

It should be understood that certain processes disclosed herein may be implemented in hardware, firmware, or software. If implemented in software, the software may be stored on any form of computer readable medium, such as random access memory (RAM), read only memory (ROM), compact disk read only memory (CD-ROM), and so forth. In operation, a general purpose or application specific processor loads and executes the software in a manner well understood in the art.

The invention claimed is:

1. A method, in a machine-to-machine proxy node, of communication comprising:
   receiving a machine-to-machine access communication request from a requesting entity in a packet based network, the access communication request including a device specific identifier associated with a device located in a mobile network;
   translating the device specific identifier, the translated identifier being associated with the packet based network;
   transmitting, to the requesting entity, a device status relating to the device located in the mobile network, the device status defined by the translated identifier;
   maintaining a mapping table, the mapping table including a plurality of entries, each entry including the device specific identifier associated with the mobile network and a corresponding translated identifier associated with the packet based network; and
   transmitting, to the requesting entity, a session notification informing the requesting entity of any device status changes in the mapping table relating to the device located in the mobile network;
   the translating including:
      indexing for an entry in the mapping table using the device specific identifier associated with the device located in the mobile network;
      retrieving from the entry the translated identifier associated with the packet based network, wherein the translated identifier is an IP address of a device in the packet based network; and
      providing the IP address as the translated identifier; and
   if the translated identifier is not retrieved,
      sending a paging notification to a processing node in the packet based network.

2. The method of claim 1 further comprising:
   receiving an access request from a Gateway General packet radio service Support Node (GGSN) or Packet Data network Gateway (PGW) node, the access request including the device specific identifier and the translated identifier; and
   recording the device specific identifier and the translated identifier in a single entry of the mapping table.

3. The method of claim 1 wherein the translating further comprises:
   determining the translated identifier;
   sending the translated identifier to the network node; and
   recording the translated identifier in a same entry as the received device specific identifier, wherein the translated identifier is an IP address of a device in the packet based network.

4. The method of claim 1 wherein the communication request includes M2M application data and the device status is a notification that the communication request has been transmitted to the packet based network.

5. A machine-to-machine proxy node comprising:
   a receiver configured to receive a machine-to-machine communication request from a requesting entity in a packet based network, the communication request including a device specific identifier associated with a device in a mobile network;
   a translator configured to:
      translate the device specific identifier, the translated identifier being associated with the packet based network;
      maintain a mapping table, the mapping table including a plurality of entries, each entry including the device specific identifier associated with the mobile network and a corresponding translated identifier associated with the packet based network;
      index for an entry in the mapping table using the device specific identifier associated with the device in the mobile network;
      retrieve from the entry the translated identifier associated with the packet based network, wherein the translated identifier is an IP address of a device in the packet based network; and
      provide the IP address as the translated identifier; and
   a transmitter configured to transmit, to the requesting entity, a device status relating to the device located in the mobile network, the device status defined by the translated identifier, the transmitter further configured to transmit, to the requesting entity, a session notification informing the requesting entity of any device status changes in the mapping table relating to the device located in the mobile network; and if the translated identifier is not retrieved, the transmitter is further configured to:
  send a pacing notification to a processing node in the packet based network requesting the translated identifier.

6. The proxy node of claim 5, wherein the receiver is further configured to receive an access request from a Gateway General packet radio service Support Node (GGSN) or Packet Data network Gateway (PGW) node, the access request including the device specific identifier and the translated identifier, and the translator further configured to record the device specific identifier and the translated identifier in a single entry of the mapping table.

7. The proxy node of claim 5 wherein the communication request includes M2M application data and the device status is a notification that the communication request has been transmitted to the packet based network.

8. A machine-to-machine communications system comprising a Packet Data network Gateway (PGW) node and a proxy node according to claim 5.

9. A method, in a machine-to-machine proxy node, of communication comprising:
  receiving a machine-to-machine access communication request from a requesting entity in a mobile network, the access communication request including a device specific identifier associated with a device in a packet based network;
  translating the device specific identifier, the translated identifier being associated with the mobile network;
  transmitting, to the requesting entity, device status relating to the device located in the packet based network, the device status defined by the translated identifier;
  maintaining a mapping table, the mapping table including a plurality of entries, each entry including the device specific identifier associated with the mobile network and a corresponding translated identifier associated with the packet based network; and
  transmitting, to the requesting entity, a session notification informing the requesting entity of any device status changes in the mapping table relating to the device located in the mobile network,
  the translating including:
    indexing for an entry in the mapping table using the device specific identifier associated with the device located in the mobile network;
    retrieving from the entry the translated identifier associated with the packet based network, wherein the translated identifier is an IP address of a device in the packet based network; and
    providing the IP address as the translated identifier; and
  if the translated identifier is not retrieved,
    sending a paging notification to a processing node in the packet based network.

* * * * *